US012676808B1

(12) United States Patent
Grandhi et al.

(10) Patent No.: US 12,676,808 B1
(45) Date of Patent: Jul. 7, 2026

(54) PROVIDING FLOOD TREE TRAVERSAL UTILIZING A CUSTOMIZED PROBE PACKET FOR A NETWORK DEVICE

(71) Applicant: Juniper Networks, Inc., Sunnyvale, CA (US)

(72) Inventors: Jagadish N. Grandhi, Hyderabad (IN); Pallav Jain, Bangalore (IN); Suryakant Pandian, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 535 days.

(21) Appl. No.: 18/318,779

(22) Filed: May 17, 2023

(51) Int. Cl.
| | |
|---|---|
| *H04L 12/66* | (2006.01) |
| *H04L 43/12* | (2022.01) |
| *H04L 45/00* | (2022.01) |
| *H04L 45/02* | (2022.01) |
| *H04L 45/741* | (2022.01) |

(52) U.S. Cl.
CPC .............. *H04L 45/02* (2013.01); *H04L 43/12* (2013.01); *H04L 45/26* (2013.01); *H04L 45/741* (2013.01)

(58) Field of Classification Search
CPC ......... H04L 41/12; H04L 45/02; H04L 41/22; H04L 41/40; H04L 41/122; H04L 12/464; H04L 45/48
See application file for complete search history.

(56) References Cited

U.S. PATENT DOCUMENTS

| | | | | |
|---|---|---|---|---|
| 6,952,421 B1 * | 10/2005 | Slater | ....................... | H04L 45/20 370/402 |
| 2003/0112809 A1 * | 6/2003 | Bharali | .................... | H04L 45/26 370/395.31 |
| 2005/0270986 A1 * | 12/2005 | Watanabe | ............... | H04L 41/12 370/252 |
| 2007/0245033 A1 * | 10/2007 | Gavrilescu | .............. | H04L 41/12 709/230 |
| 2012/0155324 A1 * | 6/2012 | Janakiraman | ........... | H04L 41/12 370/254 |
| 2014/0269266 A1 * | 9/2014 | Filsfils | .................... | H04L 45/22 370/228 |
| 2017/0126475 A1 * | 5/2017 | Mahkonen | .......... | H04L 43/0864 |
| 2019/0222481 A1 * | 7/2019 | Hira | ........................ | H04L 41/12 |
| 2020/0092251 A1 * | 3/2020 | Peterson | .............. | G06F 16/903 |
| 2020/0204472 A1 * | 6/2020 | Xue | ..................... | H04L 47/365 |
| 2021/0112000 A1 * | 4/2021 | Forster | ............... | H04L 41/0803 |
| 2023/0009602 A1 * | 1/2023 | Filsfils | .................... | H04L 43/12 |

* cited by examiner

*Primary Examiner* — Kharye Pope
(74) *Attorney, Agent, or Firm* — Harrity & Harrity, LLP

(57) ABSTRACT

A network device may receive parameters for a probe packet, and may generate the probe packet based on the parameters. The network device may provide the probe packet to multiple ingress packet forwarding components, and may generate probe packet copies at the multiple ingress packet forwarding components. The network device may generate ingress route metadata for the probe packet copies via filters provided in the multiple ingress packet forwarding components, and may provide the probe packet copies to multiple egress packet forwarding components. The network device may generate egress route metadata for the probe packet copies via filters provided in the multiple egress packet forwarding components, and may provide the probe packet copies, the ingress route metadata, and the egress route metadata to an application. The network device may utilize the application to generate a report, and may provide the report for analysis.

20 Claims, 12 Drawing Sheets

100 ⟶

100 ⟶

115
Provide the probe packet to multiple ingress packet forwarding components of the network device Ingress packet forwarding component Ingress packet forwarding component Provide probe packet Probe packet Network device

100

120

Generate probe packet copies at the multiple ingress packet forwarding components and generate ingress route metadata for the probe packet copies via filters provided in the multiple ingress packet forwarding components Probe packet copies Ingress route metadata Ingress PFCs Probe packet Network device

100

Figure 1F:
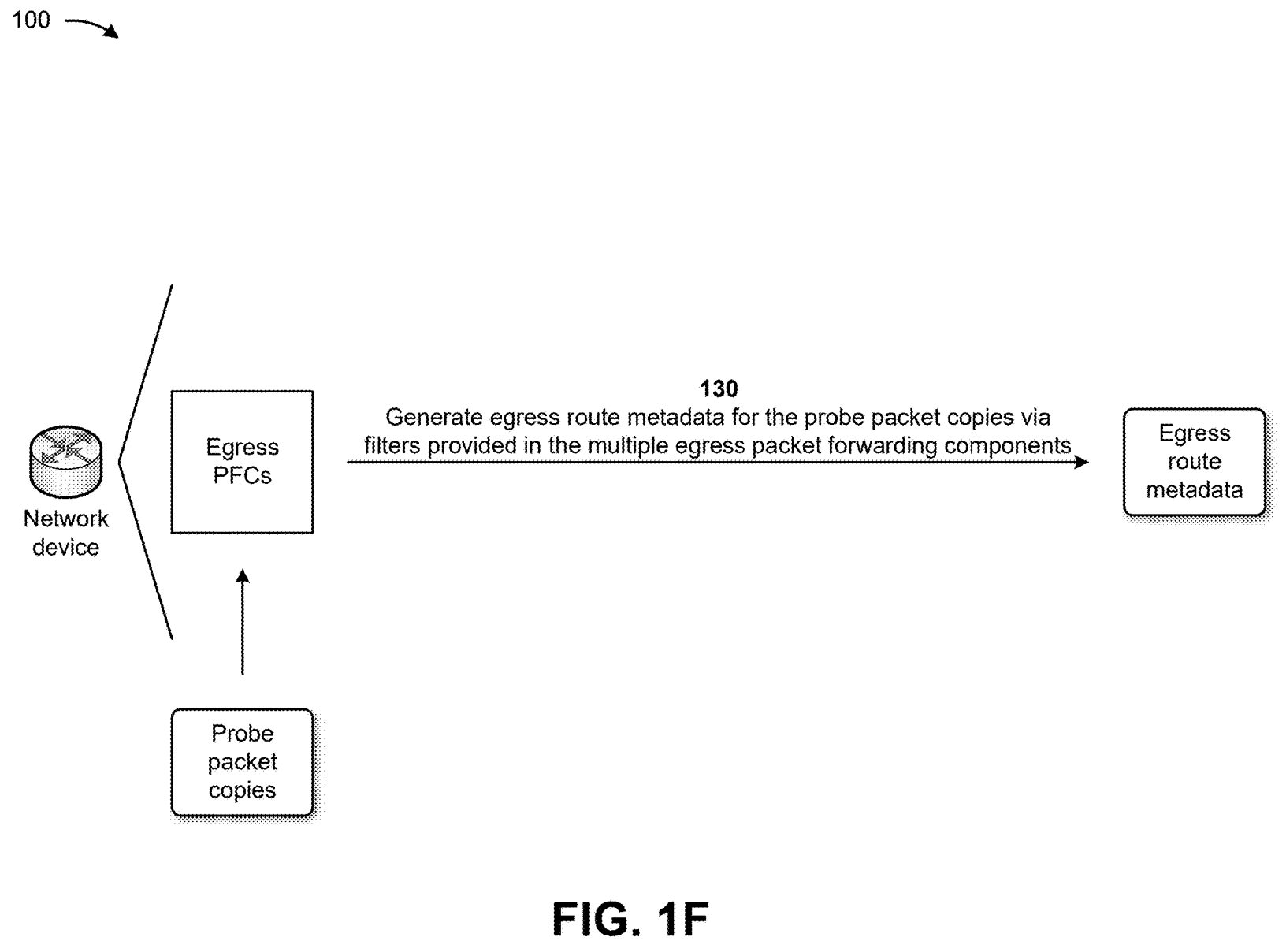

130
Generate egress route metadata for the probe packet copies via filters provided in the multiple egress packet forwarding components Egress route metadata Egress PFCs Probe packet copies Network device

135
Provide the probe packet copies, the ingress route metadata, and the egress route metadata to an application

140
Utilize the application to generate a report based on the probe packet copies, the ingress route metadata, and the egress route metadata

145
Provide the report for analysis

Report

Analysis

Application

Network device

Egress route metadata

Ingress route metadata

Probe packet copies

100

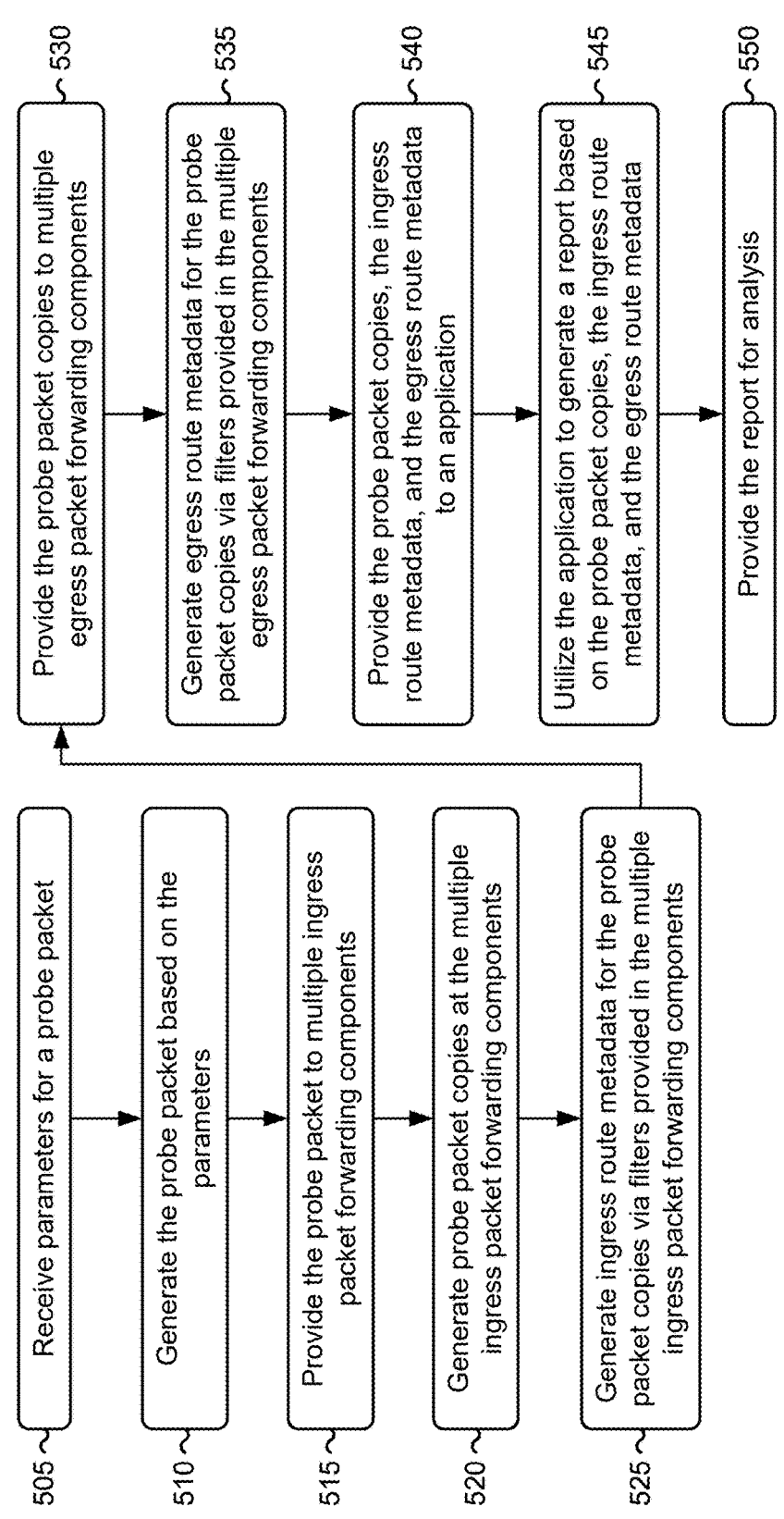

500

505 — Receive parameters for a probe packet

510 — Generate the probe packet based on the parameters

515 — Provide the probe packet to multiple ingress packet forwarding components

520 — Generate probe packet copies at the multiple ingress packet forwarding components 525 — Generate ingress route metadata for the probe packet copies via filters provided in the multiple ingress packet forwarding components 530 — Provide the probe packet copies to multiple egress packet forwarding components 535 — Generate egress route metadata for the probe packet copies via filters provided in the multiple egress packet forwarding components 540 — Provide the probe packet copies, the ingress route metadata, and the egress route metadata to an application 545 — Utilize the application to generate a report based on the probe packet copies, the ingress route metadata, and the egress route metadata 550 — Provide the report for analysis

FIG. 5

PROVIDING FLOOD TREE TRAVERSAL UTILIZING A CUSTOMIZED PROBE PACKET FOR A NETWORK DEVICE

BACKGROUND

A network device may utilize an on-the-fly replication methodology for generating multiple copies of a single packet to handle traffic across packet forwarding components hosted within the network device.

SUMMARY

Some implementations described herein relate to a method. The method may include receiving parameters for a probe packet, and generating the probe packet based on the parameters. The method may include providing the probe packet to multiple ingress packet forwarding components, and generating probe packet copies at the multiple ingress packet forwarding components. The method may include generating ingress route metadata for the probe packet copies via filters provided in the multiple ingress packet forwarding components, and providing the probe packet copies to multiple egress packet forwarding components. The method may include generating egress route metadata for the probe packet copies via filters provided in the multiple egress packet forwarding components, and providing the probe packet copies, the ingress route metadata, and the egress route metadata to an application. The method may include utilizing the application to generate a report based on the probe packet copies, the ingress route metadata, and the egress route metadata, and providing the report for analysis.

Some implementations described herein relate to a network device. The network device may include one or more processors. The one or more processors may be configured to receive parameters for a probe packet, and generate the probe packet based on the parameters. The one or more processors may be configured to provide the probe packet to multiple ingress packet forwarding components of the network device, and generate probe packet copies at the multiple ingress packet forwarding components. The one or more processors may be configured to generate ingress route metadata for the probe packet copies via filters provided in the multiple ingress packet forwarding components, and provide the probe packet copies to multiple egress packet forwarding components of the network device. The one or more processors may be configured to generate egress route metadata for the probe packet copies via filters provided in the multiple egress packet forwarding components, and provide the probe packet copies, the ingress route metadata, and the egress route metadata to an application. The one or more processors may be configured to utilize the application to generate a report based on the probe packet copies, the ingress route metadata, and the egress route metadata, and provide the report for analysis.

Some implementations described herein relate to a non-transitory computer-readable medium that stores a set of instructions for a network device. The set of instructions, when executed by one or more processors of the network device, may cause the network device to receive parameters for a probe packet, and generate the probe packet based on the parameters. The set of instructions, when executed by one or more processors of the network device, may cause the network device to provide the probe packet to multiple ingress packet forwarding components of the network device, and generate probe packet copies at the multiple ingress packet forwarding components. The set of instructions, when executed by one or more processors of the network device, may cause the network device to generate ingress route metadata for the probe packet copies via filters provided in the multiple ingress packet forwarding components, and provide the probe packet copies to multiple egress packet forwarding components of the network device. The set of instructions, when executed by one or more processors of the network device, may cause the network device to generate egress route metadata for the probe packet copies via filters provided in the multiple egress packet forwarding components, and provide the probe packet copies, the ingress route metadata, and the egress route metadata to an application. The set of instructions, when executed by one or more processors of the network device, may cause the network device to utilize the application to generate a report based on the probe packet copies, the ingress route metadata, and the egress route metadata, and utilize the report to debug the network device.

BRIEF DESCRIPTION OF THE DRAWINGS

FIGS. 1A-1H are diagrams of an example associated with providing flood tree traversal utilizing a customized probe packet for a network device.

FIG. 5 is a flowchart of an example process for providing flood tree traversal utilizing a customized probe packet for a network device.

DETAILED DESCRIPTION

Figure 1A:
Figure 1A:
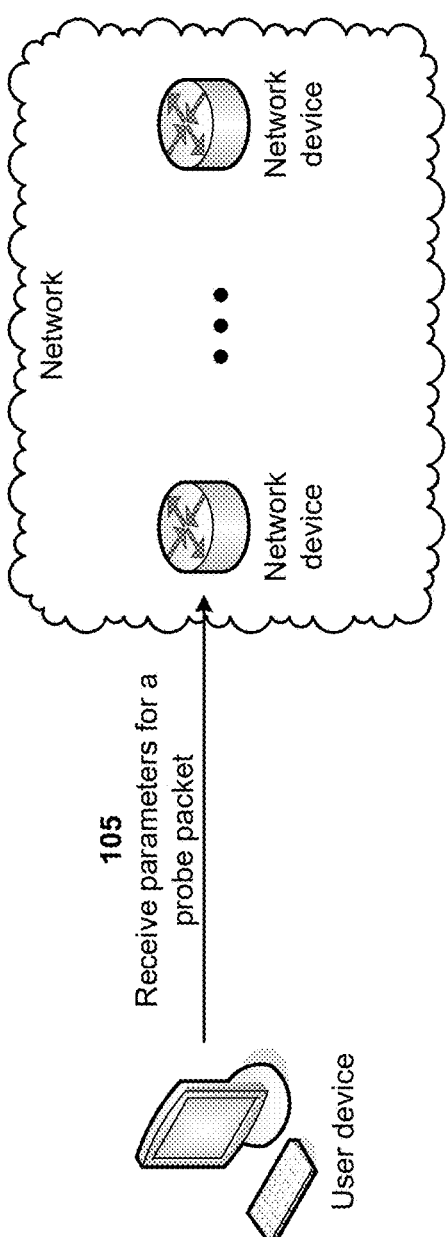

The following detailed description of example implementations refers to the accompanying drawings. The same reference numbers in different drawings may identify the same or similar elements.

A network device may include various applications (e.g., resource reservation protocol (RSVP) traffic handling, point-to-multipoint (P2MP) traffic handling, broadcast unknown-unicast (BUM) traffic handling with Ethernet virtual private network (EVPN), and/or the like) that make use of the on-the-fly replication methodology and the packet forwarding components to deliver packets within specified latency guidelines and with effective distribution of load on the packet forwarding components. With EVPN traffic handling, a network device may create multiple flood tokens for handling the BUM traffic based on a direction of traffic flow. Once the flood tokens are created, the network device may generate a sorted list of unique packet forwarding components and may execute a fabric replication tree using a packet forwarding component mask that ensures that the packets are delivered to intended recipients. The distribution of the BUM traffic may occur seamlessly, irrespective of an entry point packet forwarding component in the network device, based on rules defined in the network device.

Processing at every packet replication point occurs independently in the network device based on local states and packet forwarding component control information. However, there is no tracking mechanism available in the network device to track or report about every packet forwarding component delivering packets to subsequent downstream packet forwarding components in a packet replication tree. Without such a tracking mechanism, the network device is unable to identify problems with the network device, such as hash computation differences among the packet forwarding components, different hash seeds across different line cards of the network device, packet forwarding component exchange, a corrupted or incorrect packet forwarding component, and/or the like.

Thus, current techniques for monitoring multiple copies of a single packet to handle traffic consume computing resources (e.g., processing resources, memory resources, communication resources, and/or the like), networking resources, and/or the like, associated with failing to verify that traffic is properly handled via multiple copies of a single packet, failing to identify issues associated with traffic that is improperly handled, failing to correct the identified issues associated with the traffic, handling network outages caused by the issues associated with the traffic, and/or the like.

Some implementations described herein relate to a network device (e.g., of a key management network) that provides flood tree traversal utilizing a customized probe packet for a network device. For example, a network device may receive parameters for a probe packet, and may generate the probe packet based on the parameters. The network device may provide the probe packet to multiple ingress packet forwarding components of the network device, and may generate probe packet copies at the multiple ingress packet forwarding components. The network device may generate ingress route metadata for the probe packet copies via filters provided in the multiple ingress packet forwarding components, and may provide the probe packet copies to multiple egress packet forwarding components of the network device. The network device may generate egress route metadata for the probe packet copies via filters provided in the multiple egress packet forwarding components, and may provide the probe packet copies, the ingress route metadata, and the egress route metadata to an application. The network device may utilize the application to generate a report based on the probe packet copies, the ingress route metadata, and the egress route metadata, and may provide the report for analysis.

In this way, the network device provides flood tree traversal utilizing a customized probe packet for a network device. For example, the network device may provide an interface for defining parameters of the customized probe packet, and may provide a filter (e.g., a firewall filter) in packet forwarding components of the network device. The network device may provide the customized probe packet to a predefined route entry point of the network device, and may utilize the filters to redirect the probe packet, copies of the probe packet, and metadata to an application. The network device may utilize the application to generate a report that includes a complete route topology and forwarding results associate with the probe packet, and may provide the report for analysis. Thus, the network device conserves computing resources, networking resources, and/or the like that would otherwise have been consumed by failing to verify that traffic is properly handled via multiple copies of a single packet, failing to identify issues associated with traffic that is improperly handled, failing to correct the identified issues associated with the traffic, handling network outages caused by the issues associated with the traffic, and/or the like.

FIGS. 1A-1H are diagrams of an example 100 associated with providing flood tree traversal utilizing a customized probe packet for a network device. As shown in FIGS. 1A-1H, example 100 includes a user device and a server device associated with a network of network devices. Further details of the user device, the server device, the network, and the network devices are provided elsewhere herein.

As shown in FIG. 1A, and by reference number 105, the network device may receive parameters for a probe packet. For example, a user of the user device may input the parameters for the probe packet, and may cause the user device to provide the parameters for the probe packet to the network device. The network device may receive the parameters for the probe packet from the user device. In some implementations, the network device may provide, to the user device, a customizable user interface for defining the parameters for the probe packet. In such implementations, the user of the user device may enter the parameters via the user interface and may cause the user device to provide the parameters for the probe packet to the network device. In some implementations, the parameters for the probe packet may include a parameter identifying an interface (e.g., an ingress logical interface) of the network device for receiving the probe packet, a parameter identifying source and destination Internet protocol (IP) addresses of the probe packet, a parameter identifying source and destination media access control (MAC) addresses of the probe packet, a parameter identifying virtual local area network (VLAN) tag information (e.g., with reference to the ingress logical interface), a parameter identifying a source and destination user datagram protocol (UDP) port that matches a filter installed in multiple ingress and egress packet forwarding components of the network device, a parameter identifying a key to classify ingress route metadata and egress route metadata (e.g., metadate belonging to particular stream), and/or the like.

Figure 1B:
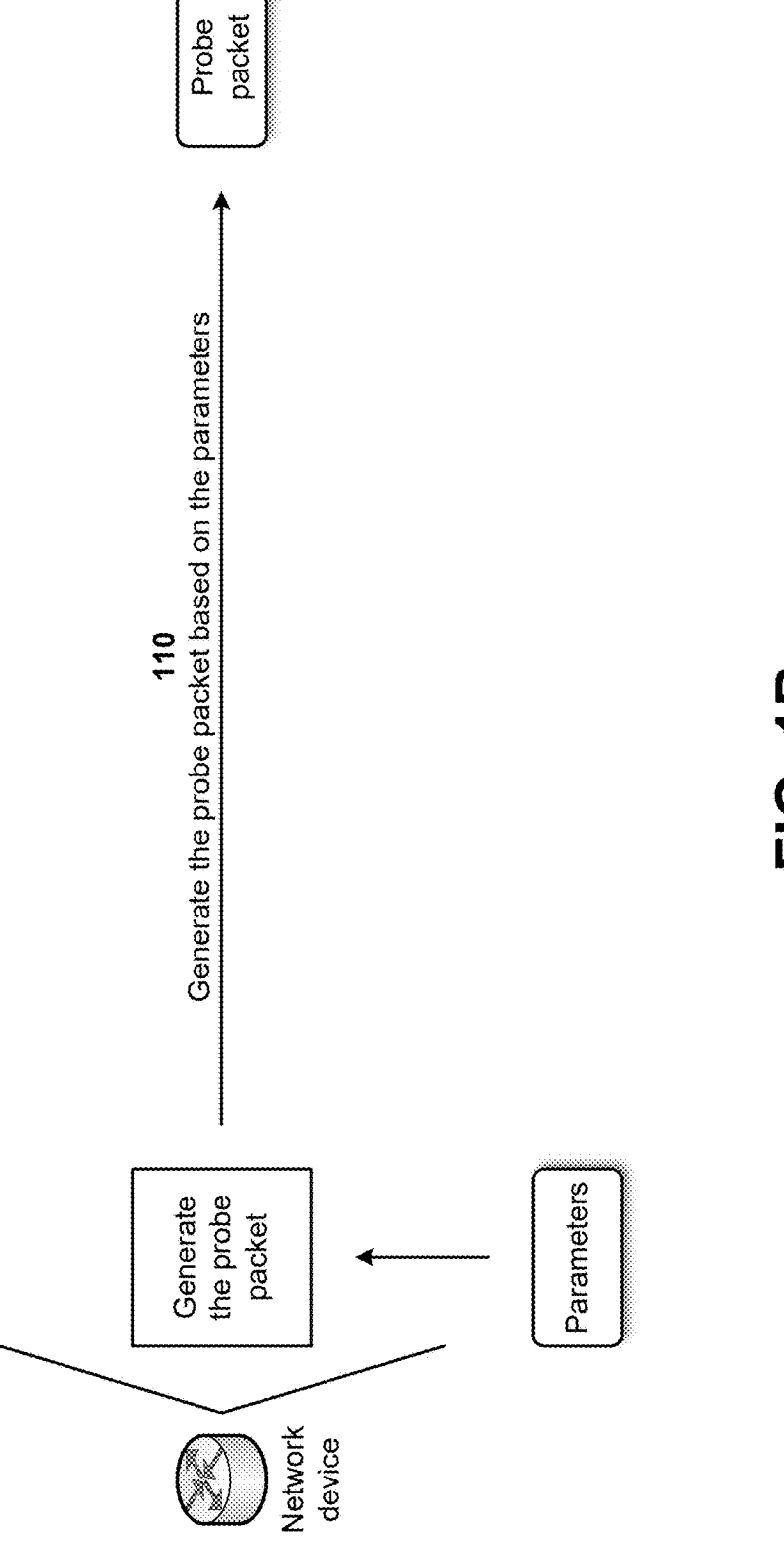

As shown in FIG. 1B, and by reference number 110, the network device may generate the probe packet based on the parameters. For example, the network device may utilize the parameters to create the probe packet (e.g., a customized packet) destined for the UPD port. In some implementations, the probe packet may be subjected to the on-the-fly replication methodology for generating multiple copies of the probe packet to handle traffic across packet forwarding components hosted within the network device.

Figure 1C:
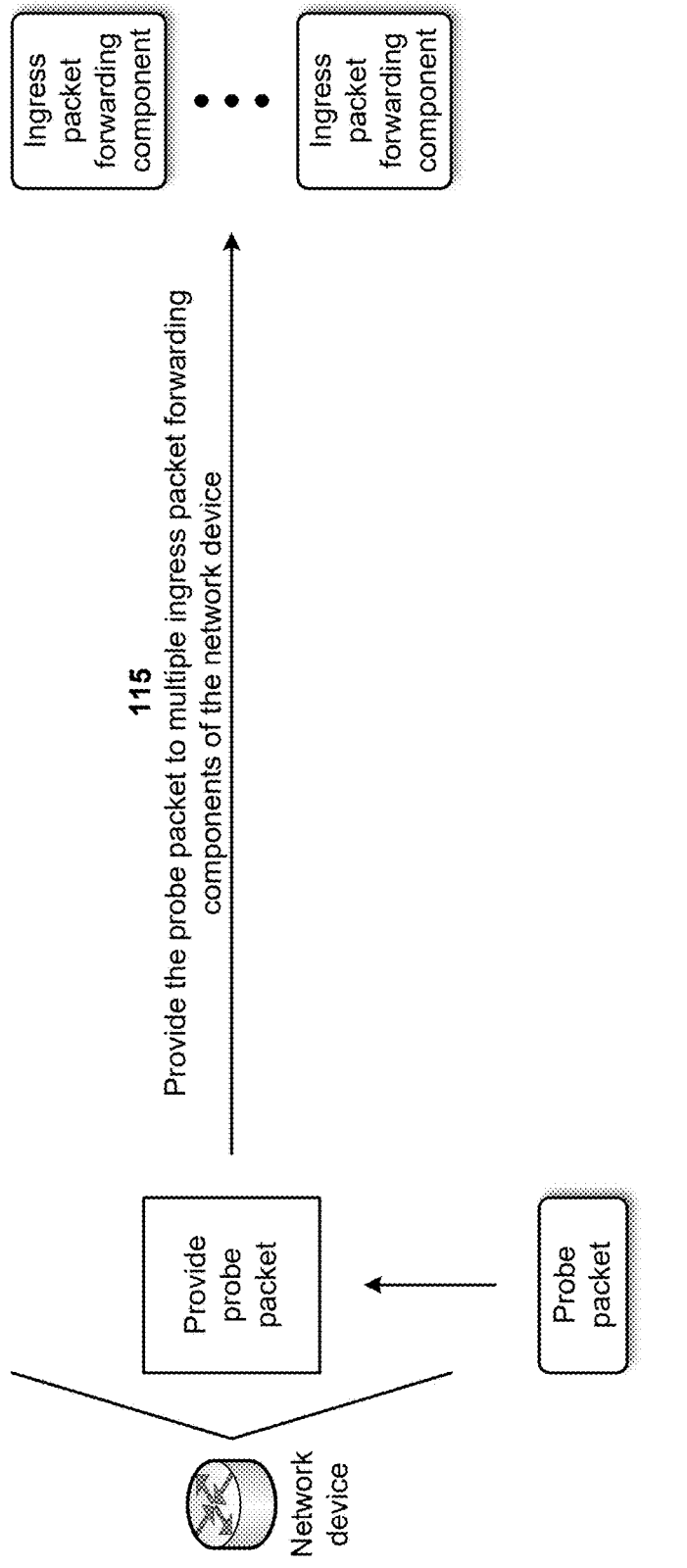

As shown in FIG. 1C, and by reference number 115, the network device may provide the probe packet to multiple ingress packet forwarding components of the network device. For example, the network device may include multiple ingress packet forwarding components, and the network device may provide the probe packet to one or more of the multiple ingress packet forwarding components. In some implementations, when providing the probe packet to the multiple ingress packet forwarding components, the network device may define an entry point (e.g., the ingress logical interface defined in the parameters) of the network device for the probe packet. In such implementations, the network device may receive the probe packet at the entry point of the network device, and may provide the probe packet from the entry point to the multiple ingress packet forwarding components of the network device. In some implementations, the entry point of the network device may vary depending on a type of the network device.

Figure 1D:
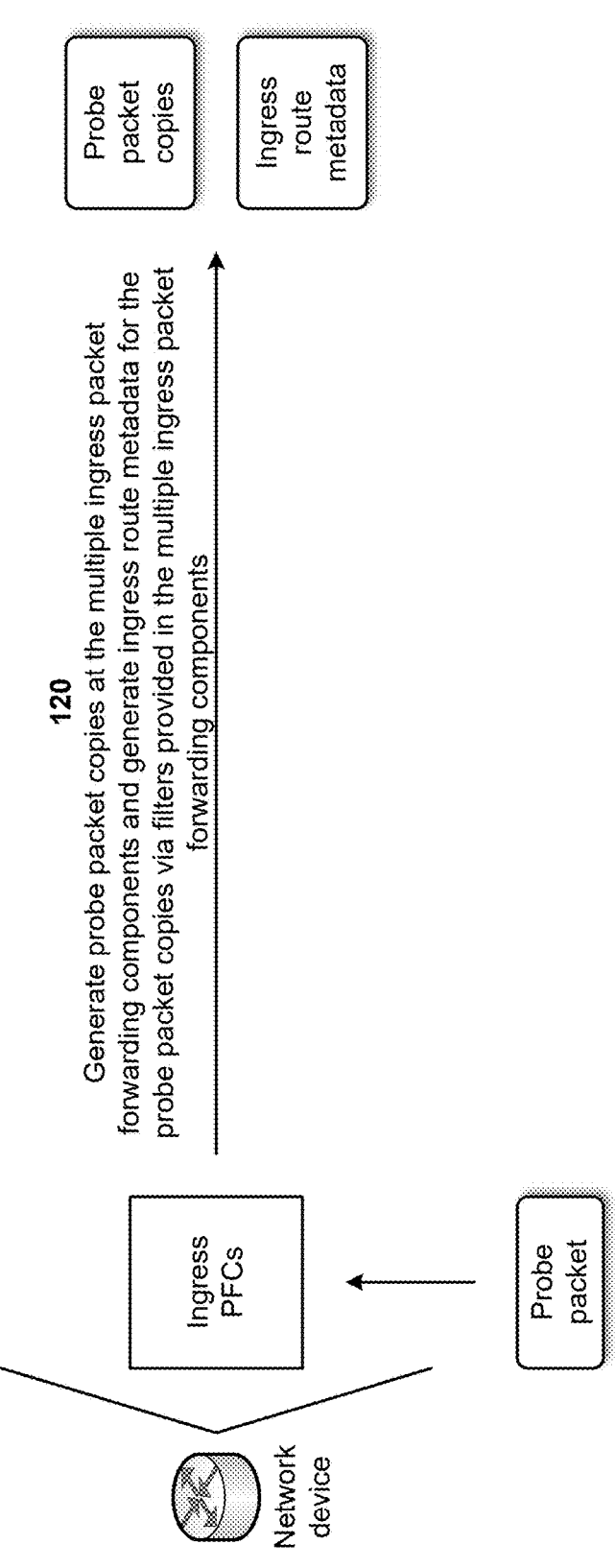

As shown in FIG. 1D, and by reference number 120, the network device may generate probe packet copies at the multiple ingress packet forwarding components and may generate ingress route metadata for the probe packet copies via filters provided in the multiple ingress packet forwarding components. For example, each of the multiple ingress packet forwarding components of the network device may utilize the on-the-fly replication methodology for generating multiple copies of the probe packet (e.g., the probe packet copies). In some implementations, each of the multiple ingress packet forwarding components may be programmed with a filter (e.g., a firewall filter) or a microcode modification that causes each of the multiple ingress packet forwarding components to generate ingress route metadata for the probe packet copies. The ingress route metadata may include data identifying one or more of a table used for route lookup for the probe packet copies, a list of next-hop information (e.g., for a replication tree), a list of multiple egress packet forwarding components of the network device (e.g., to receive the probe packet copies), details of a downstream fabric stream, a hash result (e.g., for the replication tree), details of drops associated with the probe packet copies, and/or the like. In some implementations, the ingress route metadata may be provided in a tag-length-value (TLV) format (e.g., a binary format used to represent data in a structured way).

Figure 1E:
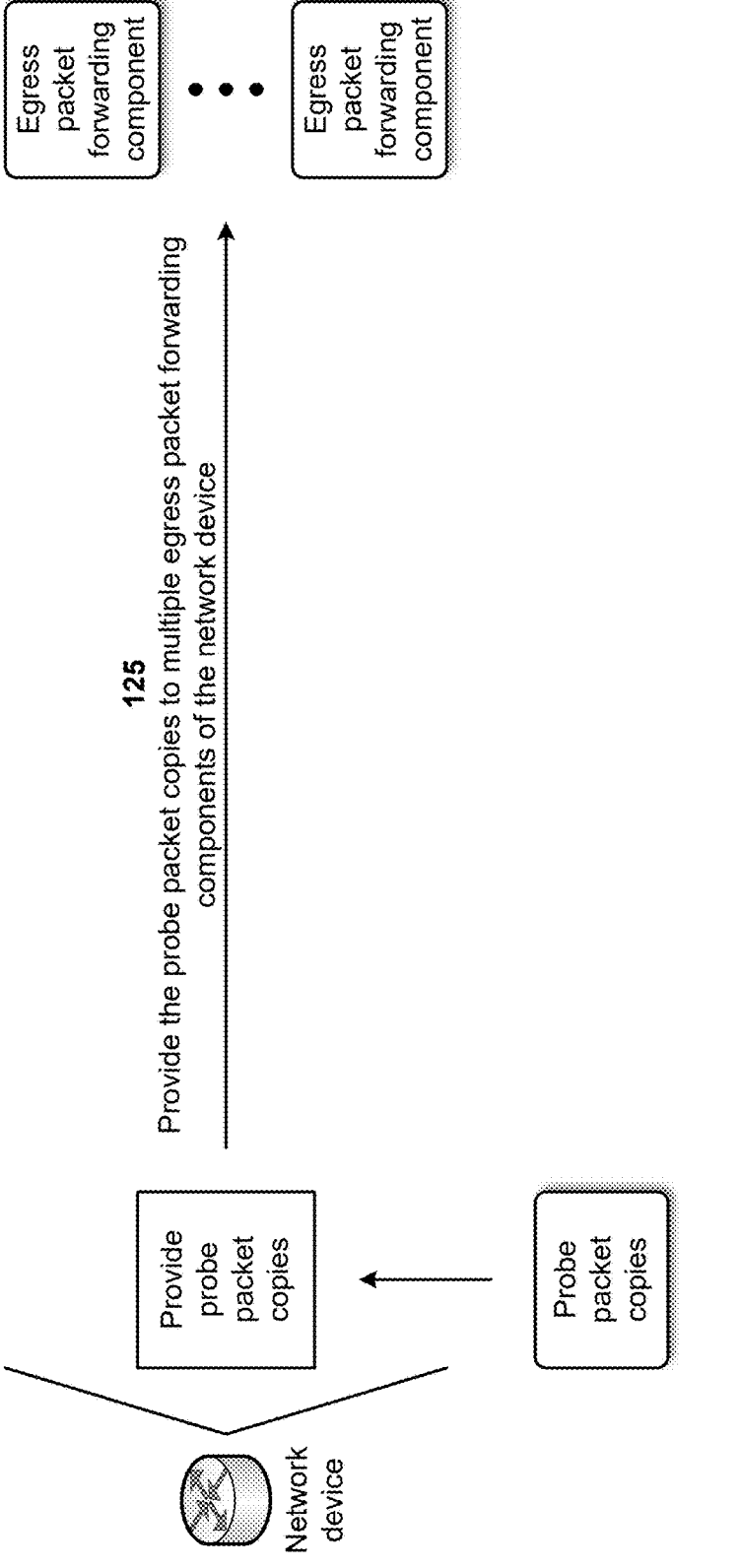

As shown in FIG. 1E, and by reference number 125, the network device may provide the probe packet copies to multiple egress packet forwarding components of the network device. For example, the network device may include multiple egress packet forwarding components, and the network device may provide the probe packet copies to one or more of the multiple egress packet forwarding components. In some implementations, the multiple egress packet forwarding components may include physical interface devices (IFDs), aggregated Ethernet (AE) interfaces, equal-cost multipath (ECMP) paths, and/or the like.

As shown in FIG. 1F, and by reference number 130, the network device may generate egress route metadata for the probe packet copies via filters provided in the multiple egress packet forwarding components. For example, each of the multiple egress packet forwarding components may be programmed with a filter (e.g., a firewall filter) or a microcode modification that causes each of the multiple egress packet forwarding components to generate egress route metadata for the probe packet copies. The egress route metadata may include data identifying one or more of details of a downstream fabric stream, a hash result (e.g., for a replication tree), details of drops associated with the probe packet copies, and/or the like. In some implementations, the egress route metadata may be provided in a TLV format.

Figure 1G:
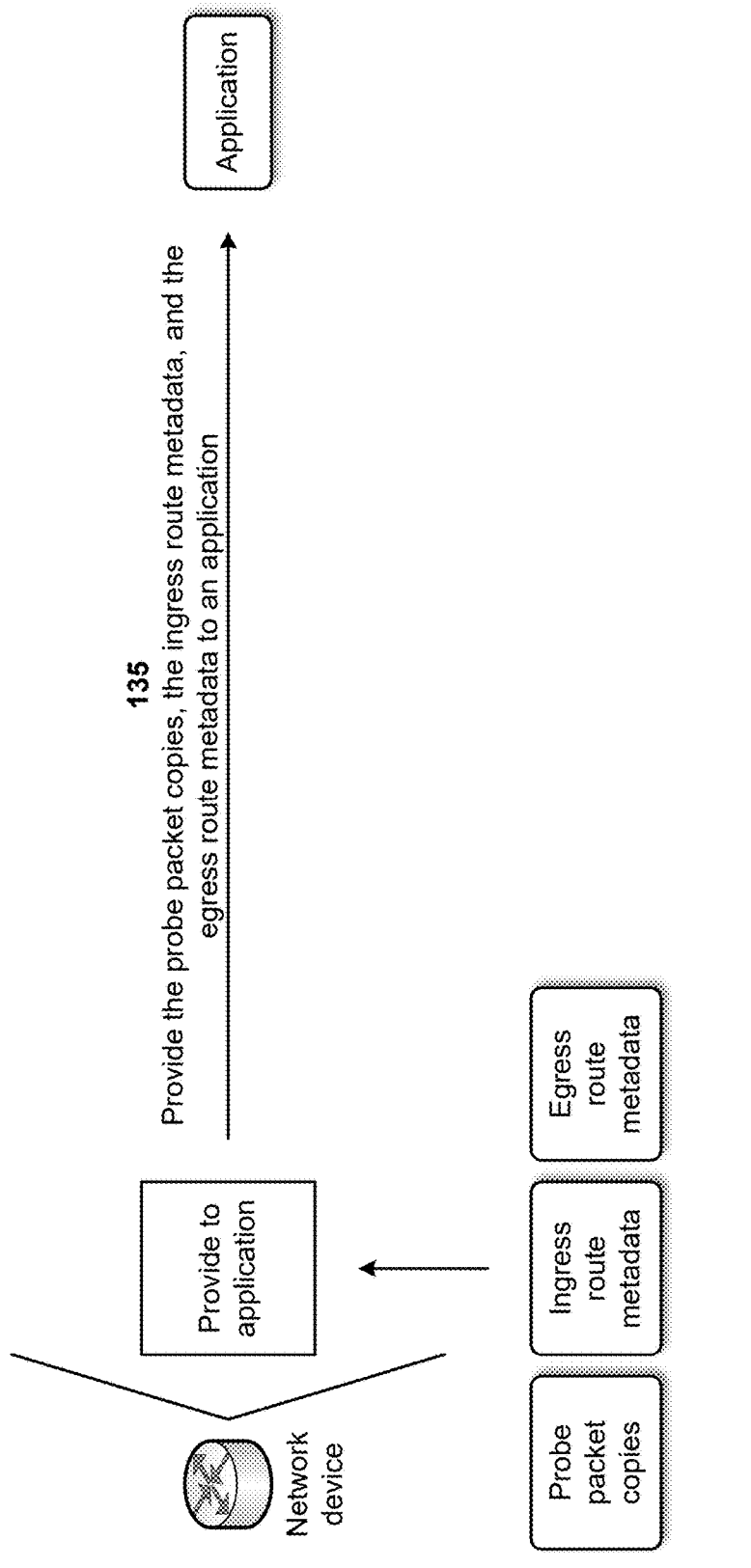

As shown in FIG. 1G, and by reference number 135, the network device may provide the probe packet copies, the ingress route metadata, and the egress route metadata to an application. For example, the network device may provide the probe packet copies, the ingress route metadata, and the egress route metadata to an application (e.g., an application layer) of the network device. In some implementations, when providing the probe packet copies, the ingress route metadata, and the egress route metadata to the application, the network device may utilize the filters provided in the multiple ingress packet forwarding components and provided in the multiple egress packet forwarding components to forward the probe packet copies, the ingress route metadata, and the egress route metadata to the application. In such implementations, the filters may cause the network device to redirect the probe packet copies, the ingress route metadata, and the egress route metadata to the application.

Figure 1H:
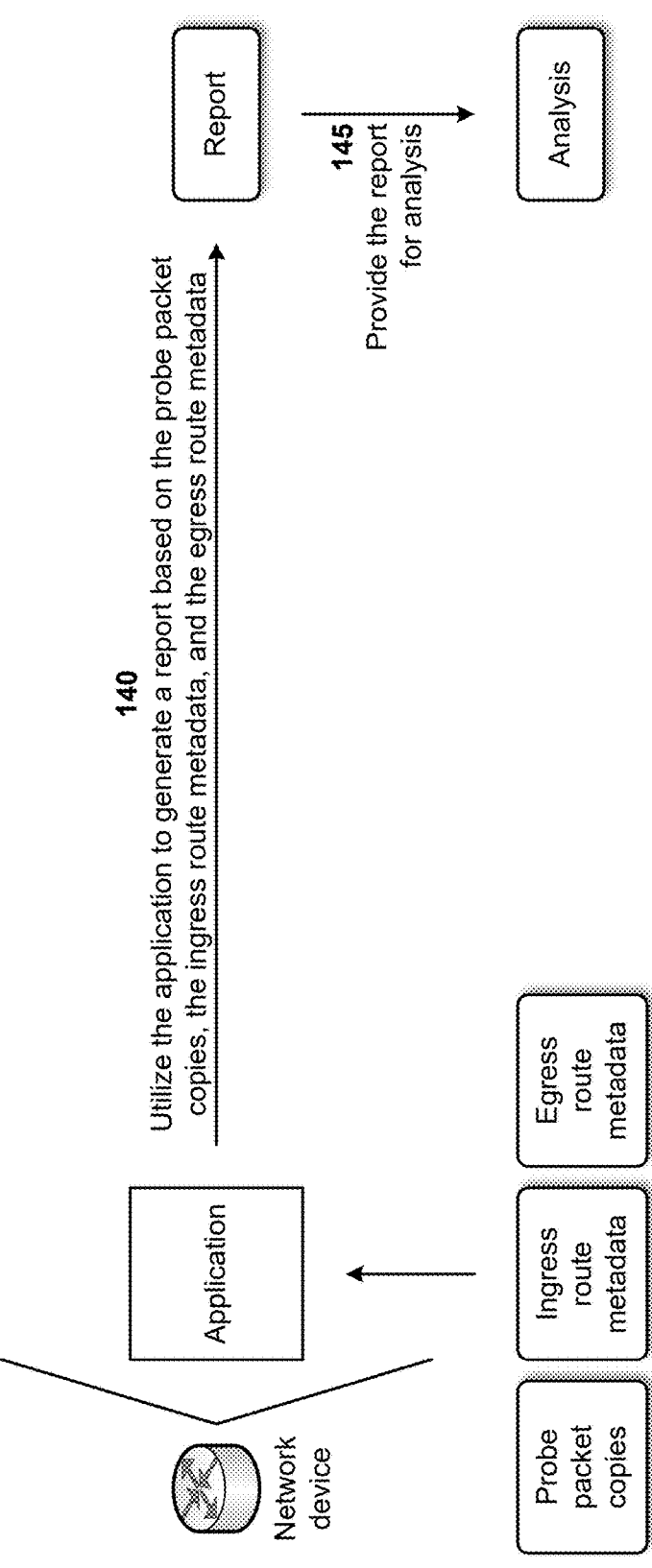

As shown in FIG. 1H, and by reference number 140, the network device may utilize the application to generate a report based on the probe packet copies, the ingress route metadata, and the egress route metadata. For example, the application may utilize the probe packet copies, the ingress route metadata, and the egress route metadata to generate the report. In some implementations, the report may include a route topology associated with the probe packet and forwarding results associated with the multiple egress packet forwarding components. In some implementations, when utilizing the application to generate the report based on the probe packet copies, the ingress route metadata, and the egress route metadata, the network device may determine whether a timer has expired, and may utilize the application to generate the report based on determining that the timer has expired. The timer may ensure that all metadata is received from the multiple ingress packet forwarding components and the multiple egress packet forwarding components before the report is generated.

In some implementations, the network device may utilize the application to build a route topology associated with the probe packet based on the ingress route metadata and the egress route metadata, and may provide the route topology in the report. In some implementations, the network device may utilize the application and the probe packet copies to identify forwarding results associated with the multiple egress packet forwarding components, and may provide the forwarding results in the report.

As further shown in FIG. 1H, and by reference number 145, the network device may provide the report for analysis. For example, the network device may provide the report to the user device, and the user device may display the report to a user that analyzes the report. In some implementations, the analysis may include debugging the network device (e.g., for traffic drop issues, consistency issues with a routing information base (RIB) and a forwarding information base (FIB), and/or the like).

In this way, the network device provides flood tree traversal utilizing a customized probe packet for a network device. For example, the network device may provide an interface for defining parameters of the customized probe packet, and may provide a filter in packet forwarding components of the network device. The network device may provide the customized probe packet to a predefined route entry point of the network device, and may utilize the filters to redirect the probe packet, copies of the probe packet, and metadata to an application. The network device may utilize the application to generate a report that includes a complete route topology and forwarding results associate with the probe packet, and may provide the report for analysis. Thus, the network device conserves computing resources, networking resources, and/or the like that would otherwise have been consumed by failing to verify that traffic is properly handled via multiple copies of a single packet, failing to identify issues associated with traffic that is improperly handled, failing to correct the identified issues associated with the traffic, handling network outages caused by the issues associated with the traffic, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
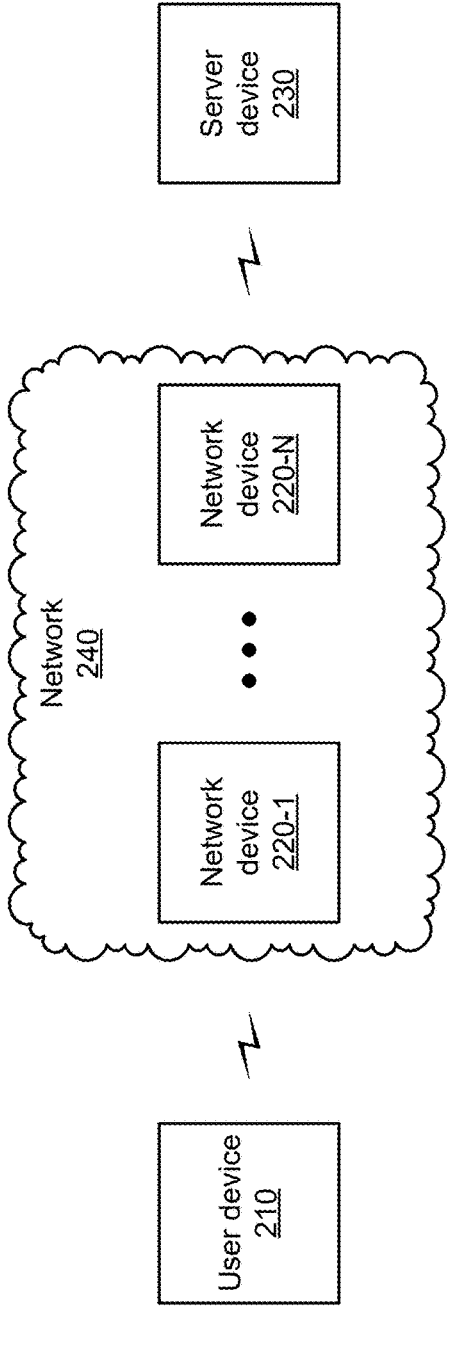
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a group of network devices 220 (shown as network device 220-1 through network device 220-N), a server device 230, and a network 240. Devices of the environment 200 may interconnect via wired connections, wireless connections, or a combination of wired and wireless connections.

The user device 210 may include one or more devices capable of receiving, generating, storing, processing, and/or providing information, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, and/or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
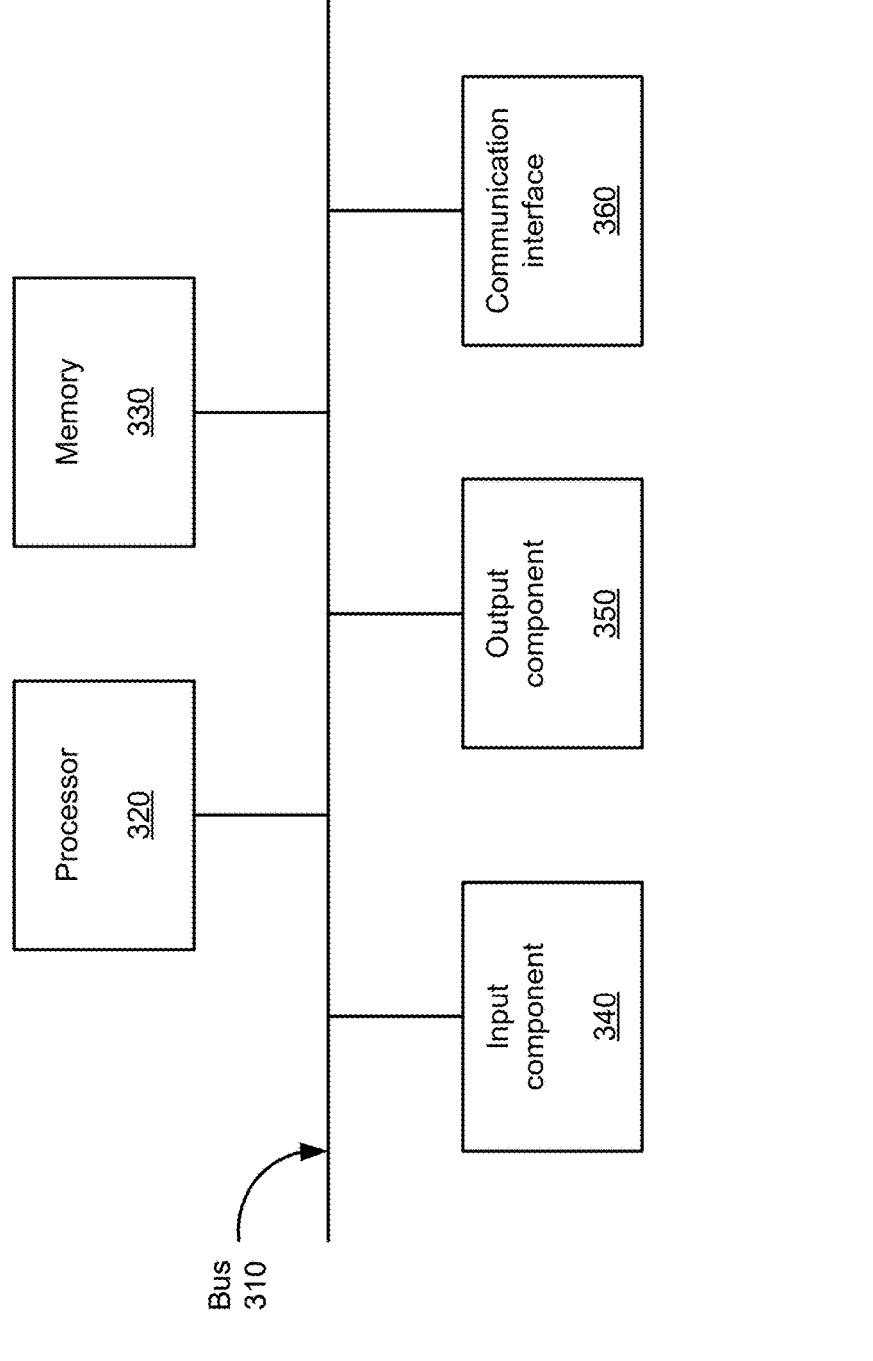
FIGS. 3 and 4 are diagrams of example components of one or more devices of FIG. 2.

FIG. 3 is a diagram of example components of one or more devices of FIG. 2. The example components may be included in a device 300, which may correspond to the user device 210, the network device 220, and/or the server device 230. In some implementations, the user device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
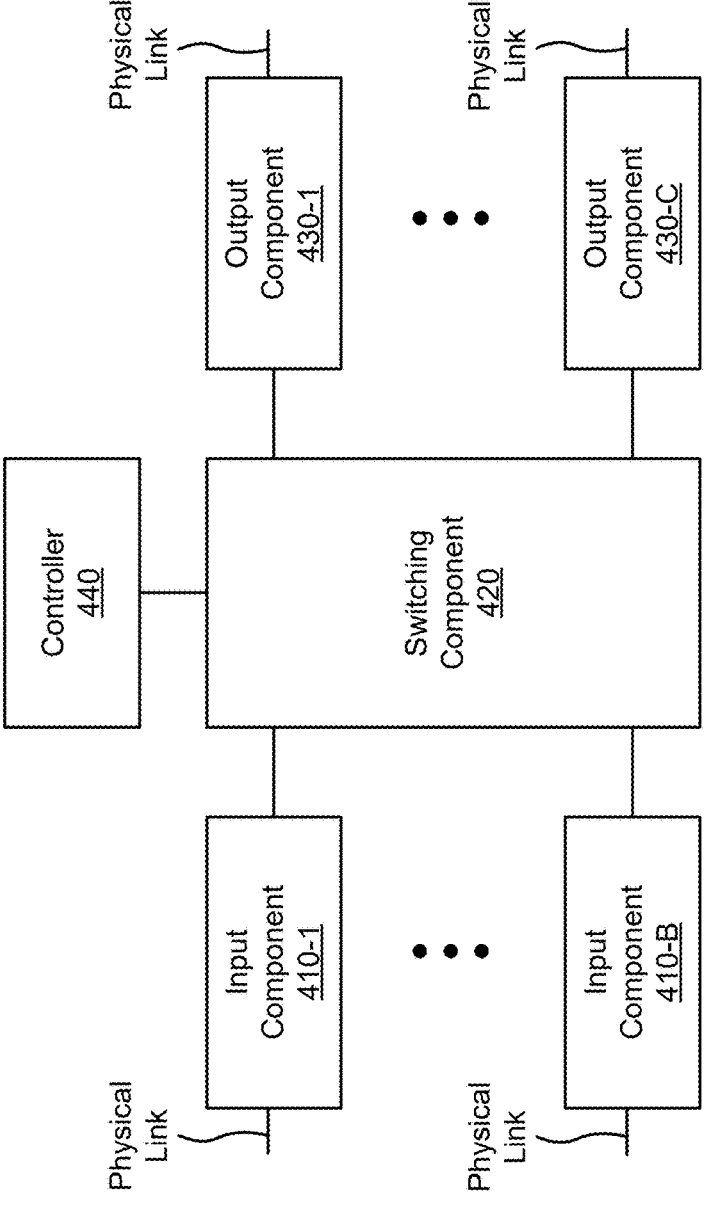

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links.

The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for providing flood tree traversal utilizing a customized probe packet for a network device. In some implementations, one or more process blocks of FIG. 5 may be performed by a network device (e.g., the network device 220). In some implementations, one or more process blocks of FIG. 5 may be performed by another device or a group of devices separate from or including the network device. Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving parameters for a probe packet (block 505). For example, the network device may receive parameters for a probe packet, as described above. In some implementations, the parameters include one or more of a parameter identifying an interface of the network device for receiving the probe packet, a parameter identifying source and destination Internet protocol addresses, a parameter identifying source and destination media access control addresses, a parameter identifying virtual local area network tag information, a parameter identifying a source and destination user datagram protocol port, or a parameter identifying a key to classify the ingress route metadata and the egress route metadata.

As further shown in FIG. 5, process 500 may include generating the probe packet based on the parameters (block 510). For example, the network device may generate the probe packet based on the parameters, as described above.

As further shown in FIG. 5, process 500 may include providing the probe packet to multiple ingress packet forwarding components of the network device (block 515). For example, the network device may provide the probe packet to multiple ingress packet forwarding components of the network device, as described above. In some implementations, providing the probe packet to the multiple ingress packet forwarding components includes defining an entry point of the network device for the probe packet, receiving the probe packet at the entry point of the network device, and providing the probe packet from the entry point to the multiple ingress packet forwarding components.

As further shown in FIG. 5, process 500 may include generating probe packet copies at the multiple ingress packet forwarding components (block 520). For example, the network device may generate probe packet copies at the multiple ingress packet forwarding components, as described above.

As further shown in FIG. 5, process 500 may include generating ingress route metadata for the probe packet copies via filters provided in the multiple ingress packet forwarding components (block 525). For example, the network device may generate ingress route metadata for the probe packet copies via filters provided in the multiple ingress packet forwarding components, as described above. In some implementations, the ingress route metadata includes data identifying one or more of a table used for route lookup for the probe packet copies, a list of next-hop information, a list of the multiple egress packet forwarding components, details of a downstream fabric stream, a hash result, or details of drops associated with the probe packet copies.

As further shown in FIG. 5, process 500 may include providing the probe packet copies to multiple egress packet forwarding components of the network device (block 530). For example, the network device may provide the probe packet copies to multiple egress packet forwarding components of the network device, as described above.

As further shown in FIG. 5, process 500 may include generating egress route metadata for the probe packet copies via filters provided in the multiple egress packet forwarding components (block 535). For example, the network device may generate egress route metadata for the probe packet copies via filters provided in the multiple egress packet forwarding components, as described above. In some implementations, each of the filters provided in the multiple ingress packet forwarding components and in the multiple egress packet forwarding components is one of a firewall filter or a microcode modification. In some implementations, the egress route metadata includes data identifying one or more of details of a downstream fabric stream, a hash result, or details of drops associated with the probe packet copies.

As further shown in FIG. 5, process 500 may include providing the probe packet copies, the ingress route metadata, and the egress route metadata to an application (block 540). For example, the network device may provide the probe packet copies, the ingress route metadata, and the egress route metadata to an application, as described above. In some implementations, providing the probe packet copies, the ingress route metadata, and the egress route metadata to the application includes utilizing the filters provided in the multiple ingress packet forwarding components and provided in the multiple egress packet forwarding components to forward the ingress route metadata and the egress route metadata to the application.

As further shown in FIG. 5, process 500 may include utilizing the application to generate a report based on the probe packet copies, the ingress route metadata, and the egress route metadata (block 545). For example, the network device may utilize the application to generate a report based on the probe packet copies, the ingress route metadata, and the egress route metadata, as described above. In some implementations, the report includes a route topology associated with the probe packet and forwarding results associated with the multiple egress packet forwarding components. In some implementations, utilizing the application to generate the report based on the probe packet copies, the ingress route metadata, and the egress route metadata includes determining whether a timer has expired, and utilizing the application to generate the report based on determining that the timer has expired.

As further shown in FIG. 5, process 500 may include providing the report for analysis (block 550). For example, the network device may provide the report for analysis, as described above. In some implementations, providing the report for analysis includes providing the report for display to a user device. In some implementations, the analysis includes debugging the network device.

In some implementations, process 500 includes utilizing the application to build a route topology associated with the probe packet based on the ingress route metadata and the egress route metadata, where the report includes the route topology. In some implementations, process 500 includes utilizing the application and the probe packet copies to identify forwarding results associated with the multiple egress packet forwarding components, where the report includes the forwarding results.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

14

What is claimed is:

1. A method, comprising:
receiving, by a network device, parameters for a probe packet;
generating, by the network device, the probe packet based on the parameters;
providing, by the network device, the probe packet to multiple ingress packet forwarding components of the network device;
generating, by the network device, probe packet copies at the multiple ingress packet forwarding components, wherein each of the multiple ingress packet forwarding components is programmed with a filter that causes each of the multiple ingress packet forwarding components to generate ingress route metadata for the probe packet copies;
generating, by the network device, the ingress route metadata via the filters provided in the multiple ingress packet forwarding components;
providing, by the network device, the probe packet copies to multiple egress packet forwarding components of the network device;
generating, by the network device, egress route metadata for the probe packet copies via filters provided in the multiple egress packet forwarding components;
providing, by the network device, the probe packet copies, the ingress route metadata, and the egress route metadata to an application;
utilizing, by the network device, the application to generate a report based on the probe packet copies, the ingress route metadata, and the egress route metadata; and
providing, by the network device, the report for analysis.

2. The method of claim 1, wherein the parameters include one or more of:
a parameter identifying an interface of the network device for receiving the probe packet,
a parameter identifying source and destination Internet protocol addresses,
a parameter identifying source and destination media access control addresses,
a parameter identifying virtual local area network tag information,
a parameter identifying a source and destination user datagram protocol port, or
a parameter identifying a key to classify the ingress route metadata and the egress route metadata.

3. The method of claim 1, wherein each of the filters provided in the multiple ingress packet forwarding components and in the multiple egress packet forwarding components is one of a firewall filter or a microcode modification.

4. The method of claim 1, wherein the ingress route metadata includes data identifying one or more of:
a table used for route lookup for the probe packet copies,
a list of next-hop information,
a list of the multiple egress packet forwarding components,
details of a downstream fabric stream,
a hash result, or
details of drops associated with the probe packet copies.

5. The method of claim 1, wherein the egress route metadata includes data identifying one or more of:
details of a downstream fabric stream,
a hash result, or
details of drops associated with the probe packet copies.

6. The method of claim 1, further comprising:

utilizing the application to build a route topology associated with the probe packet based on the ingress route metadata and the egress route metadata, wherein the report includes the route topology.

7. The method of claim 1, further comprising:

utilizing the application and the probe packet copies to identify forwarding results associated with the multiple egress packet forwarding components, wherein the report includes the forwarding results.

8. A network device, comprising:

one or more memories; and one or more processors to:

receive parameters for a probe packet;

generate the probe packet based on the parameters;

provide the probe packet to multiple ingress packet forwarding components of the network device;

generate probe packet copies at the multiple ingress packet forwarding components, wherein each of the multiple ingress packet forwarding components is programmed with a filter that causes each of the multiple ingress packet forwarding components to generate ingress route metadata for the probe packet copies;

generate the ingress route metadata via the filters provided in the multiple ingress packet forwarding components;

provide the probe packet copies to multiple egress packet forwarding components of the network device;

generate egress route metadata for the probe packet copies via filters provided in the multiple egress packet forwarding components, wherein each of the filters provided in the multiple ingress packet forwarding components and in the multiple egress packet forwarding components is one of a firewall filter or a microcode modification;

provide the probe packet copies, the ingress route metadata, and the egress route metadata to an application;

utilize the application to generate a report based on the probe packet copies, the ingress route metadata, and the egress route metadata; and provide the report for analysis.

9. The network device of claim 8, wherein the report includes a route topology associated with the probe packet and forwarding results associated with the multiple egress packet forwarding components.

10. The network device of claim 8, wherein the one or more processors, to provide the report for analysis, are to:

provide the report for display to a user device.

11. The network device of claim 8, wherein the one or more processors, to provide the probe packet to the multiple ingress packet forwarding components, are to:

define an entry point of the network device for the probe packet;

receive the probe packet at the entry point of the network device; and provide the probe packet from the entry point to the multiple ingress packet forwarding components.

12. The network device of claim 8, wherein the one or more processors, to provide the probe packet copies, the ingress route metadata, and the egress route metadata to the application, are to:

utilize the filters provided in the multiple ingress packet forwarding components and provided in the multiple egress packet forwarding components to forward the ingress route metadata and the egress route metadata to the application.

13. The network device of claim 8, wherein the one or more processors, to utilize the application to generate the report based on the probe packet copies, the ingress route metadata, and the egress route metadata, are to:

determine whether a timer has expired; and utilize the application to generate the report based on determining that the timer has expired.

14. The network device of claim 8, wherein the analysis includes debugging the network device.

15. A non-transitory computer-readable medium storing a set of instructions, the set of instructions comprising:

one or more instructions that, when executed by one or more processors of a network device, cause the network device to:

receive parameters for a probe packet;

generate the probe packet based on the parameters;

provide the probe packet to multiple ingress packet forwarding components of the network device;

generate probe packet copies at the multiple ingress packet forwarding components, wherein each of the multiple ingress packet forwarding components is programmed with a filter that causes each of the multiple ingress packet forwarding components to generate ingress route metadata for the probe packet copies;

generate the ingress route metadata via the filters provided in the multiple ingress packet forwarding components;

provide the probe packet copies to multiple egress packet forwarding components of the network device;

generate egress route metadata for the probe packet copies via filters provided in the multiple egress packet forwarding components;

provide the probe packet copies, the ingress route metadata, and the egress route metadata to an application;

utilize the application to generate a report based on the probe packet copies, the ingress route metadata, and the egress route metadata; and utilize the report to debug the network device.

16. The non-transitory computer-readable medium of claim 15, wherein the parameters include one or more of:

a parameter identifying an interface of the network device for receiving the probe packet, a parameter identifying source and destination Internet protocol addresses, a parameter identifying source and destination media access control addresses, a parameter identifying virtual local area network tag information, a parameter identifying a source and destination user datagram protocol port, or a parameter identifying a key to classify the ingress route metadata and the egress route metadata.

17. The non-transitory computer-readable medium of claim 15, wherein the one or more instructions further cause the network device to:

utilize the application to build a route topology associated with the probe packet based on the ingress route metadata and the egress route metadata, wherein the report includes the route topology.

18. The non-transitory computer-readable medium of claim 15, wherein the one or more instructions further cause the network device to:

utilize the application and the probe packet copies to identify forwarding results associated with the multiple egress packet forwarding components, wherein the report includes the forwarding results.

19. The non-transitory computer-readable medium of claim 15, wherein the one or more instructions, that cause the network device to provide the probe packet to the multiple ingress packet forwarding components, cause the network device to:

define an entry point of the network device for the probe packet;

receive the probe packet at the entry point of the network device; and provide the probe packet from the entry point to the multiple ingress packet forwarding components.

20. The non-transitory computer-readable medium of claim 15, wherein the one or more instructions, that cause the network device to provide the probe packet copies, the ingress route metadata, and the egress route metadata to the application, cause the network device to:

utilize the filters provided in the multiple ingress packet forwarding components and provided in the multiple egress packet forwarding components to forward the ingress route metadata and the egress route metadata to the application.

\* \* \* \* \*